Figure 1:
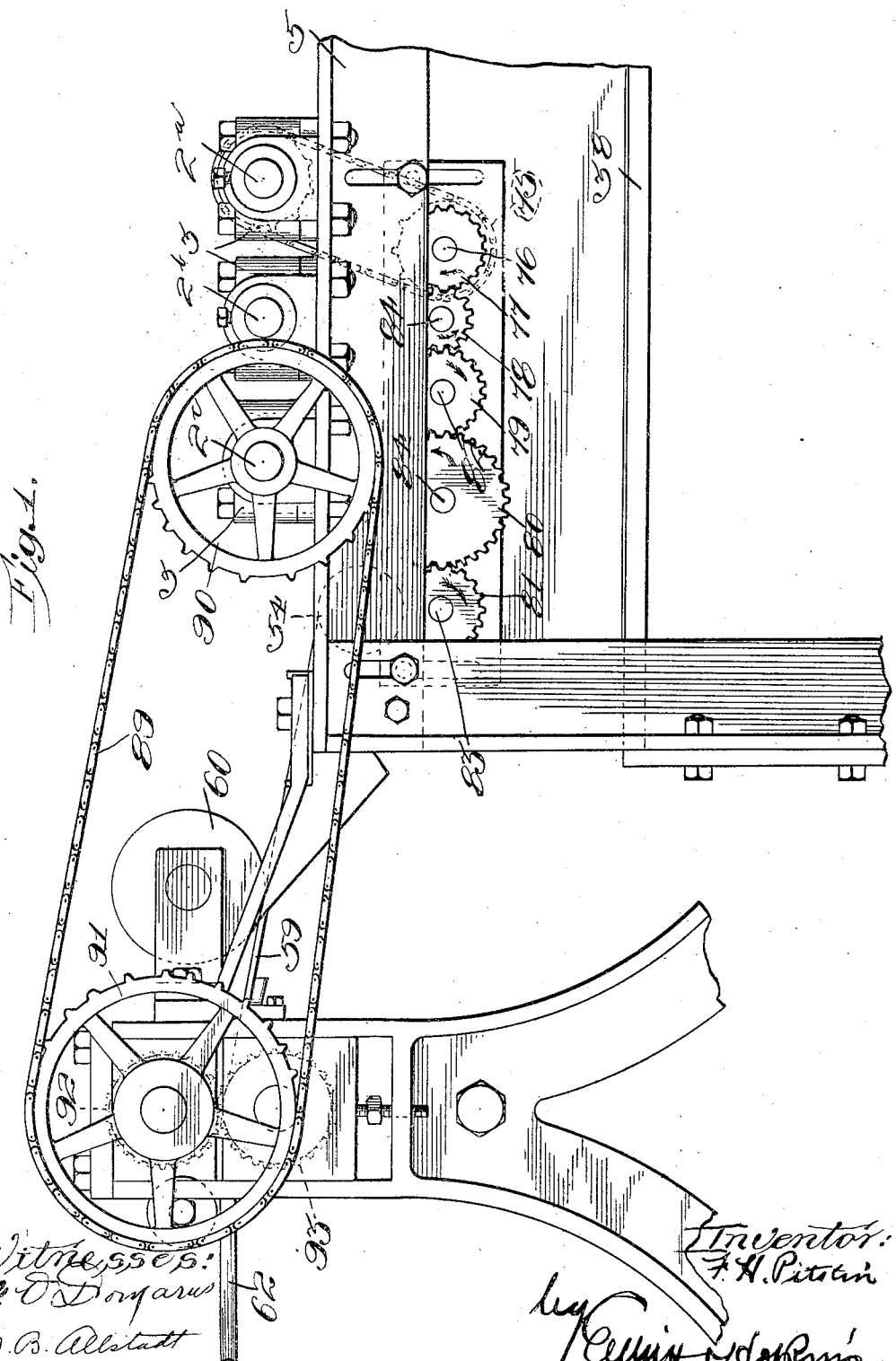

No. 806,912. PATENTED DEC. 12, 1905.
F. H. PITKIN.
EXPANDED METAL MACHINE.
APPLICATION FILED SEPT. 29, 1904.

12 SHEETS—SHEET 1.

No. 806,912. PATENTED DEC. 12, 1905.
F. H. PITKIN.
EXPANDED METAL MACHINE.
APPLICATION FILED SEPT. 29, 1904.

12 SHEETS—SHEET 2.

Witnesses:
Inventor:
F H Pitkin
by Elliott & Hopkins
Attys

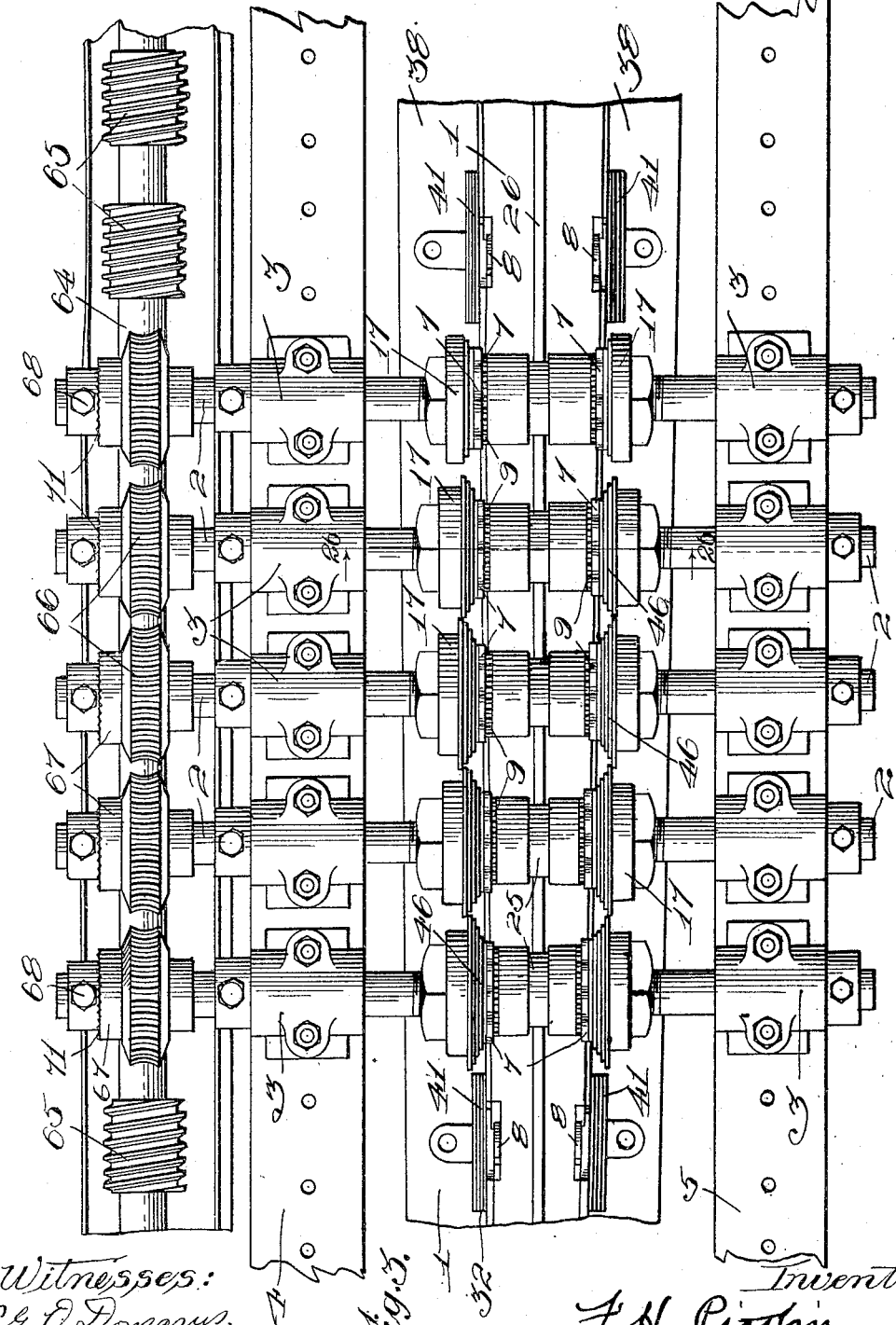

No. 806,912. PATENTED DEC. 12, 1905.
F. H. PITKIN.
EXPANDED METAL MACHINE.
APPLICATION FILED SEPT. 29, 1904.
12 SHEETS—SHEET 4.
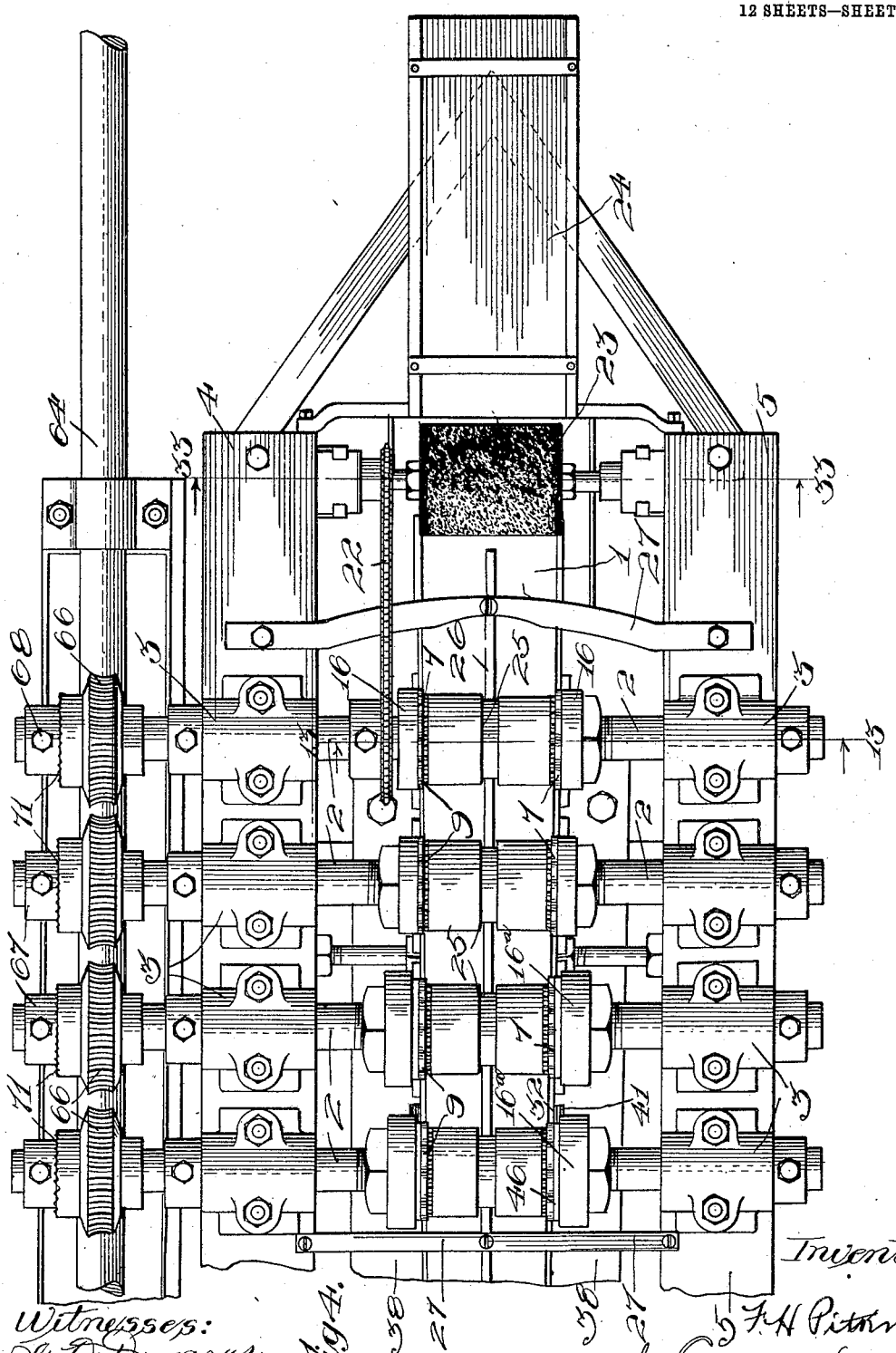

No. 806,912. PATENTED DEC. 12, 1905.
F. H. PITKIN.
EXPANDED METAL MACHINE.
APPLICATION FILED SEPT. 29, 1904.
12 SHEETS—SHEET 5.
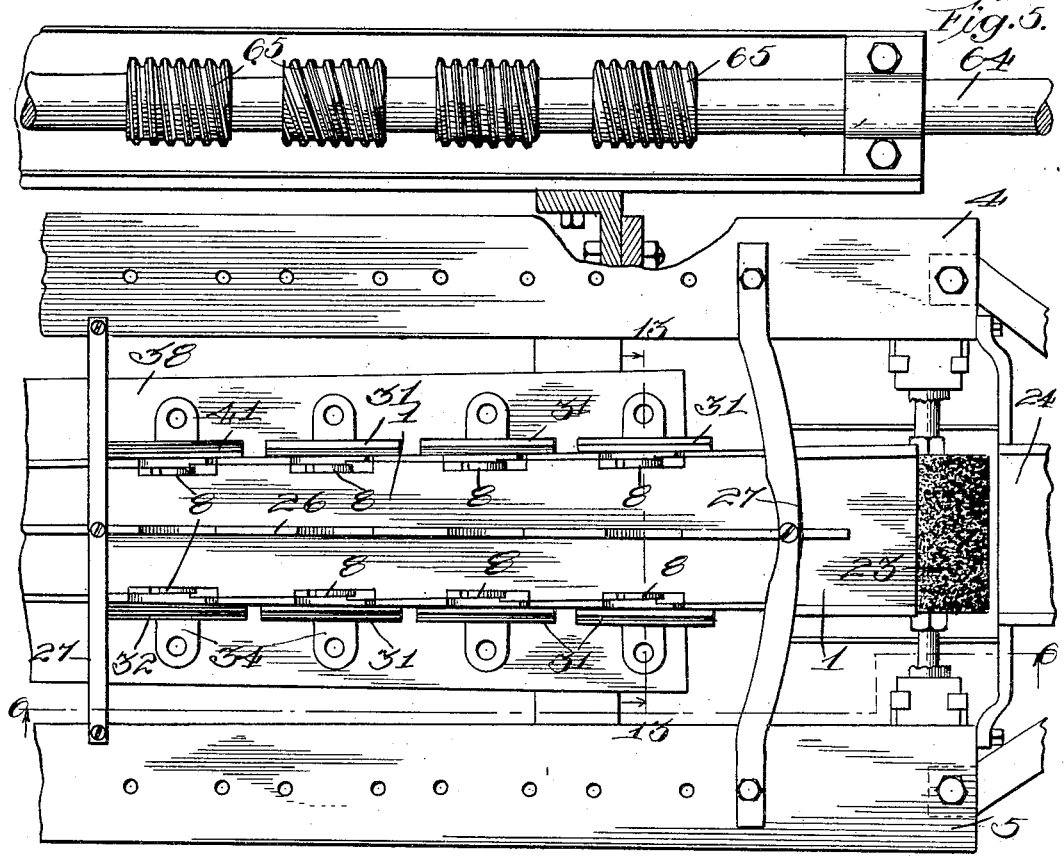
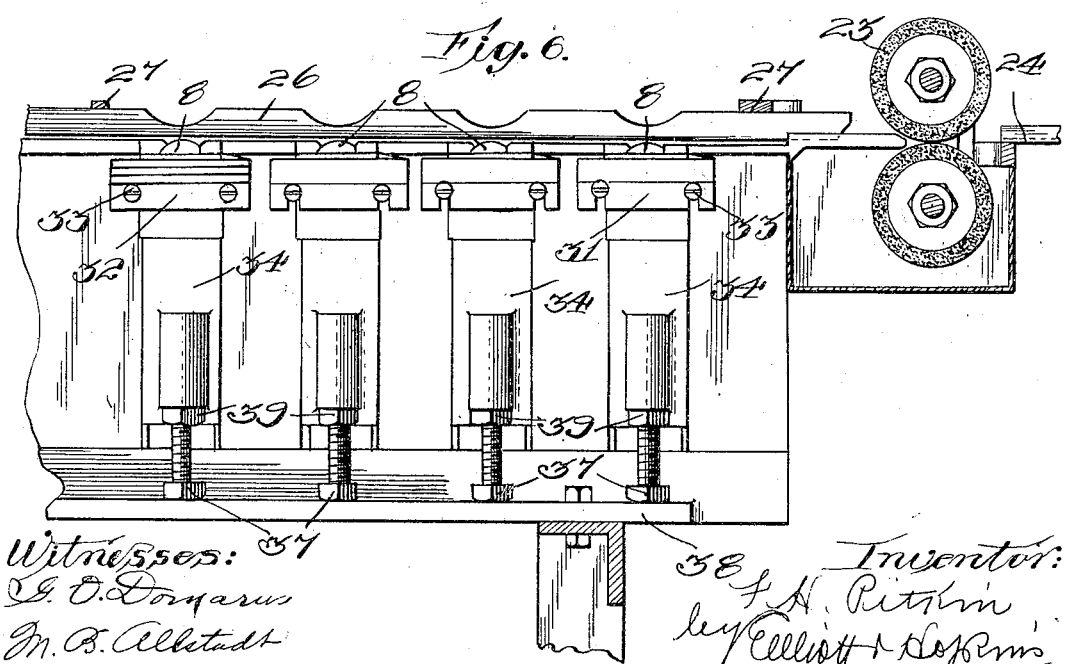

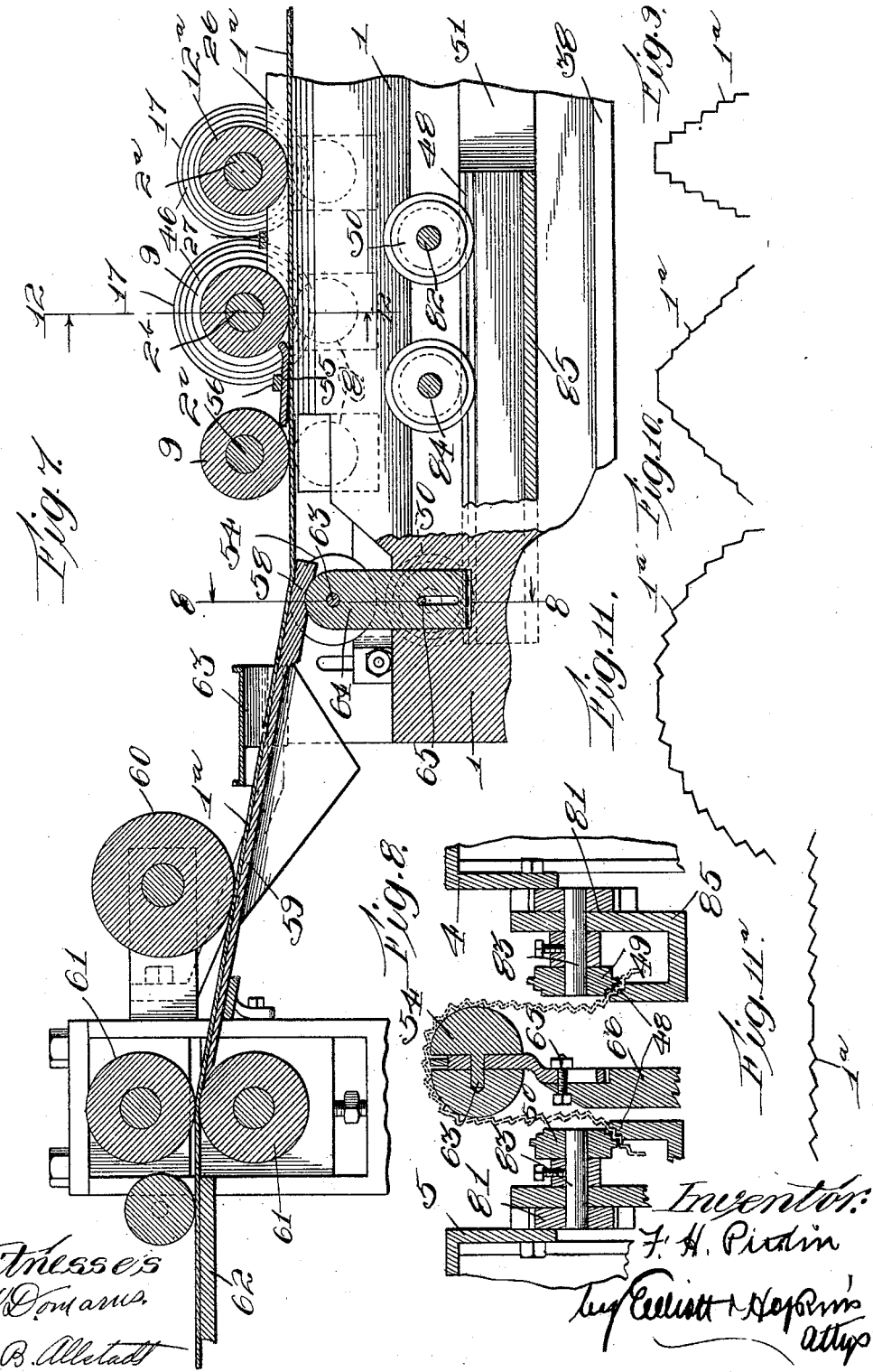

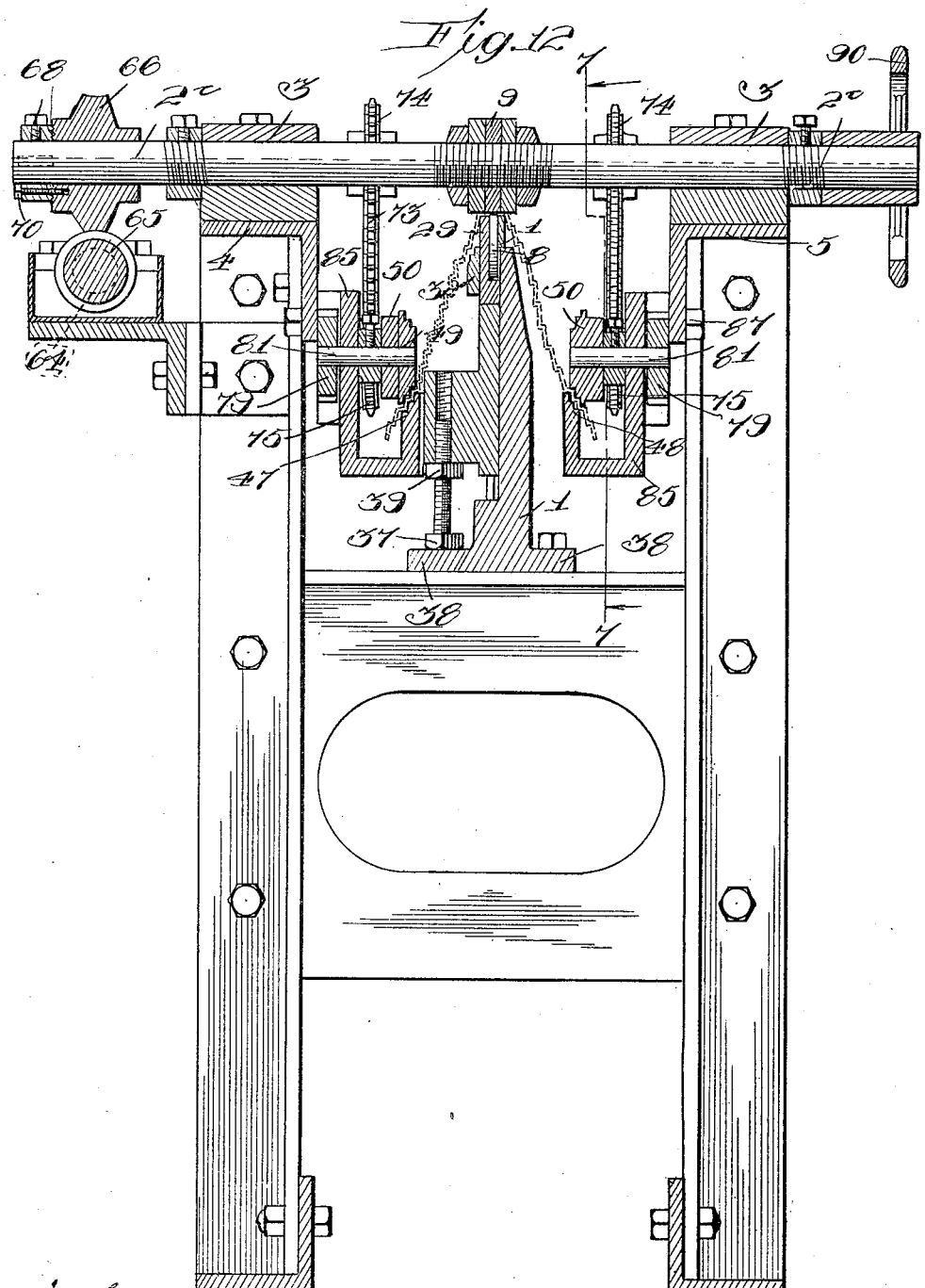

No. 806,912. PATENTED DEC. 12, 1905.
F. H. PITKIN.
EXPANDED METAL MACHINE.
APPLICATION FILED SEPT. 29, 1904.
12 SHEETS—SHEET 8.
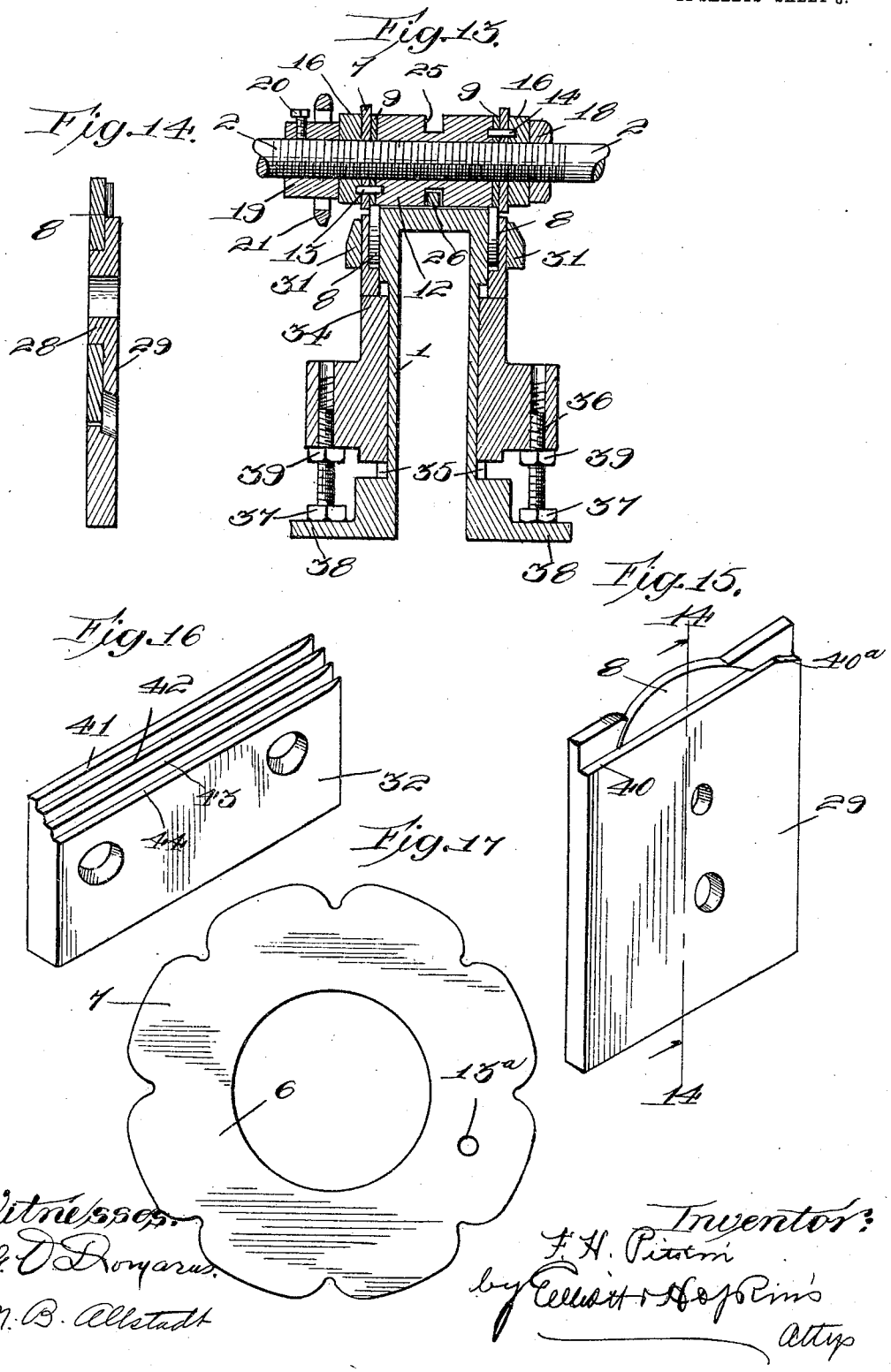

No. 806,912. PATENTED DEC. 12, 1905.
F. H. PITKIN.
EXPANDED METAL MACHINE.
APPLICATION FILED SEPT. 29, 1904.
12 SHEETS—SHEET 9.
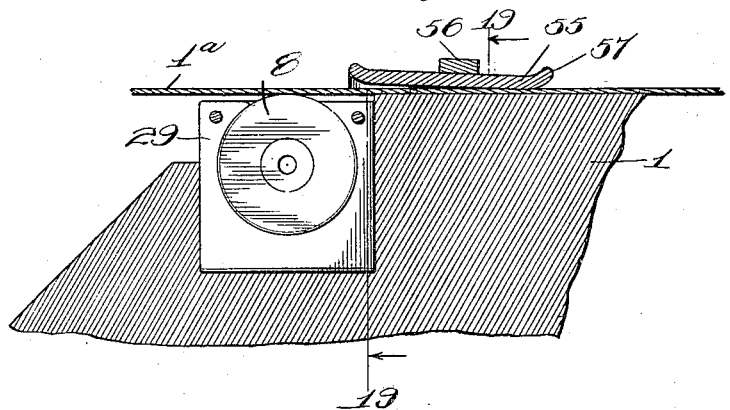
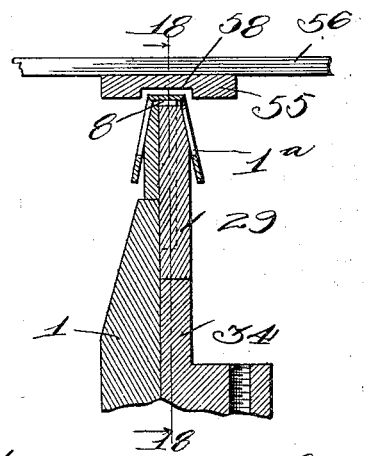
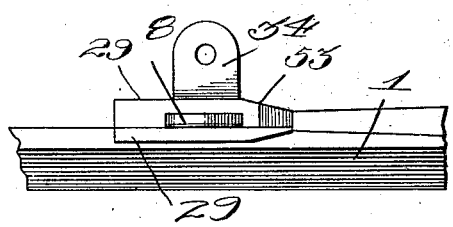
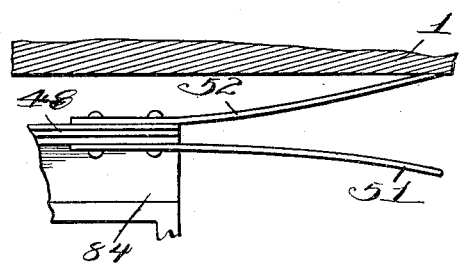
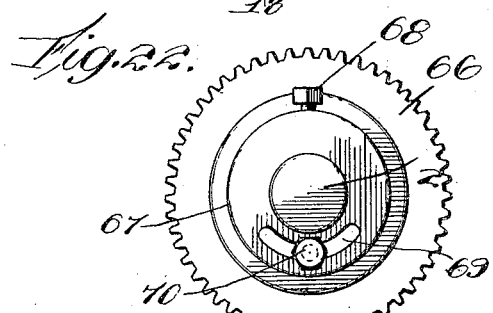
Witnesses:
G. V. Domarus.
M. B. Allstadt
Inventor:
F. H. Pitkin
by Elliott & Hopkins
Attys

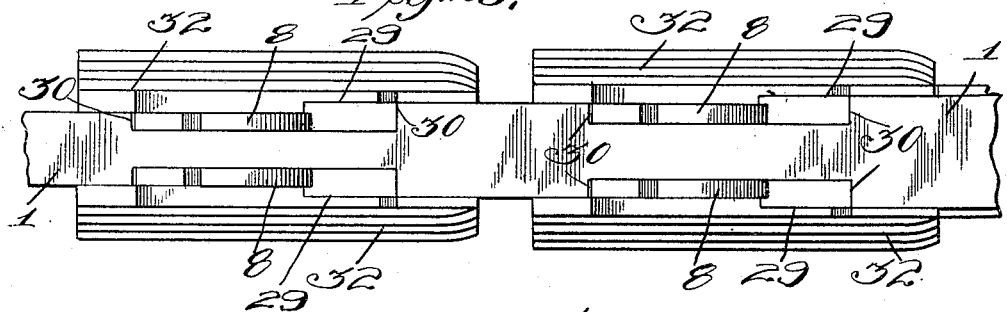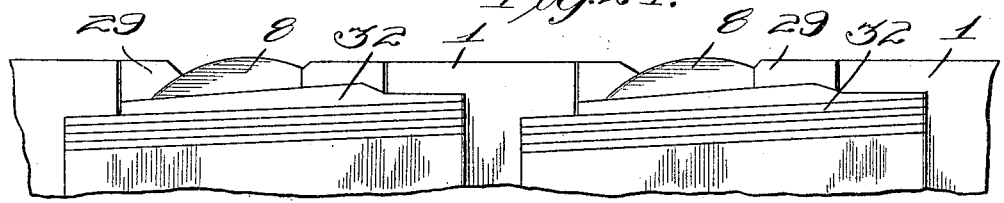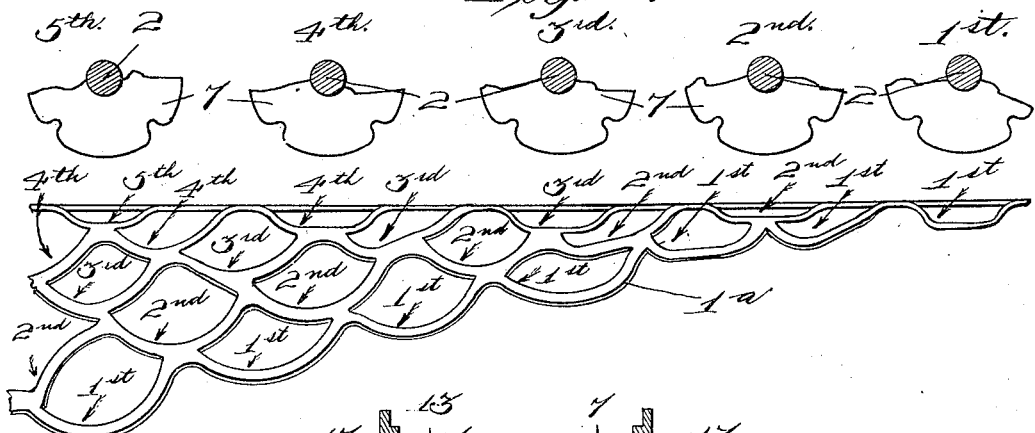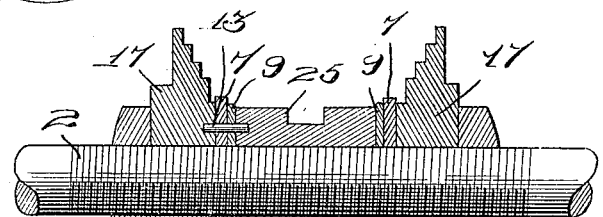

No. 806,912. PATENTED DEC. 12, 1905.
F. H. PITKIN.
EXPANDED METAL MACHINE.
APPLICATION FILED SEPT. 29, 1904.
12 SHEETS—SHEET 11.
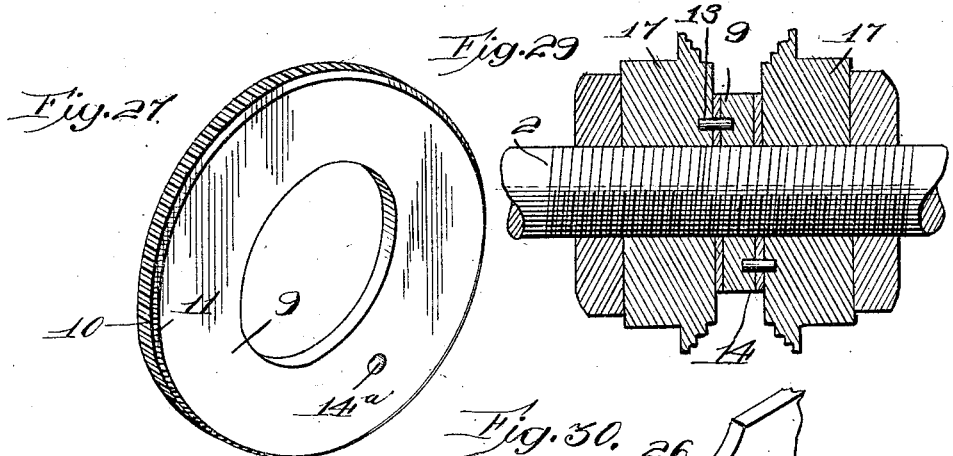
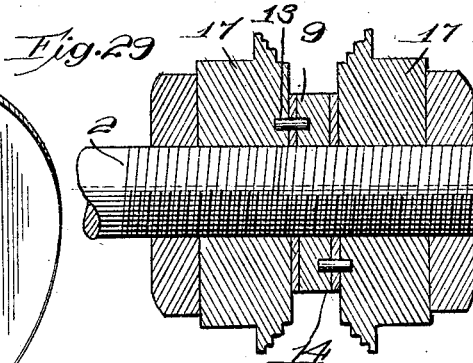
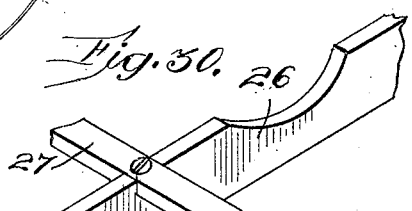
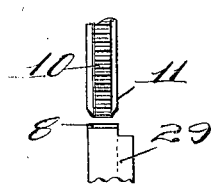
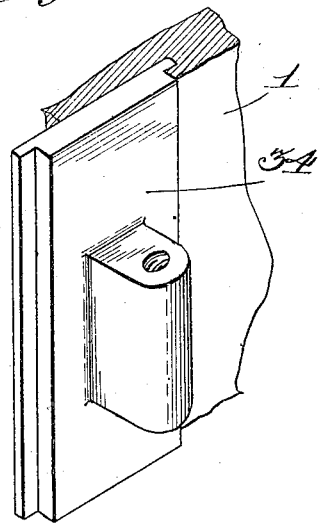
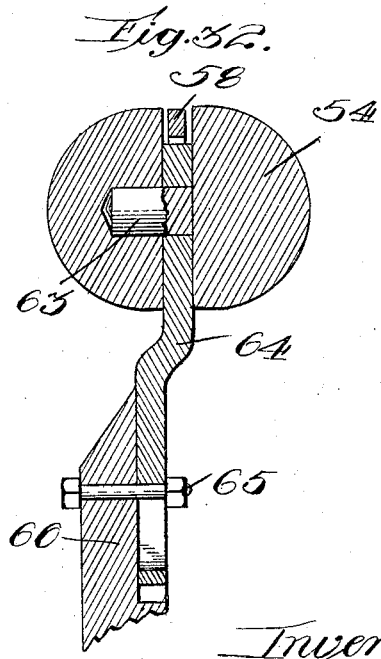
Witnesses:
Inventor:
F. H. Pitkin

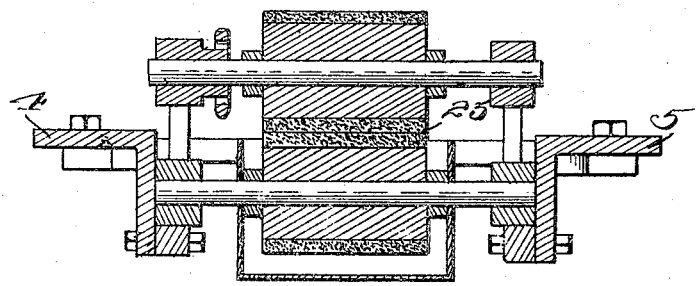
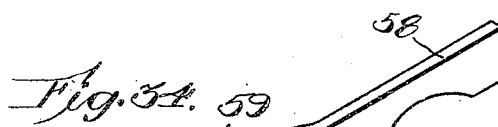
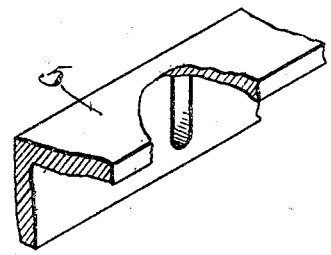
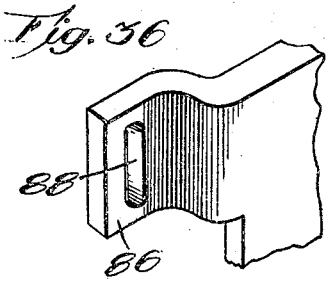

UNITED STATES PATENT OFFICE.

FRANK H. PITKIN, OF CHICAGO, ILLINOIS.

EXPANDED-METAL MACHINE.

No. 806,912.      Specification of Letters Patent.      Patented Dec. 12, 1905.

Application filed September 29, 1904. Serial No. 226,457.

*To all whom it may concern:*

Be it known that I, FRANK H. PITKIN, a citizen of the United States, residing at Chicago, in the county of Cook and State of Illinois, have invented certain new and useful Improvements in Expanded-Metal Machines, of which the following is a full, clear, and exact specification.

This invention relates to expanded-metal machines, and is designed more especially as an improvement on the machine covered by my United States Patent No. 619,340, issued February 14, 1899, for a machine for making expanded metal, in which are employed rotating cutters arranged in a line or series converging toward the longitudinal axis of the sheet or strip and serving to slit the metal and press the strands downwardly over the edge of a suitable table or base which supports the uncut portion of the strip.

One of the important objects of the present invention is to provide means other than the cutters themselves for expanding or stretching the strands apart after they are cut. In the said former invention the star-shaped cutters themselves were relied on for accomplishing this expansion of the strands; but in some instances the mesh again closes at the outer edges of the strip while it is being expanded at the inner portion. A strip of expanded metal when produced by this method with two converging series of cutters results in a form which is inverted-V shape in cross-section; but to be suitable for use it should be flat.

Another object of the invention, therefore, is to straighten or flatten out the strip after it is slitted and expanded without permitting it to lose its expansion.

With these ends in view the invention consists in certain features of novelty in the construction, combination, and arrangement of parts by which the said objects and certain other objects which will hereinafter appear are attained, all as fully described, with reference to the accompanying drawings, and more particularly pointed out in the claims.

Figure 2:
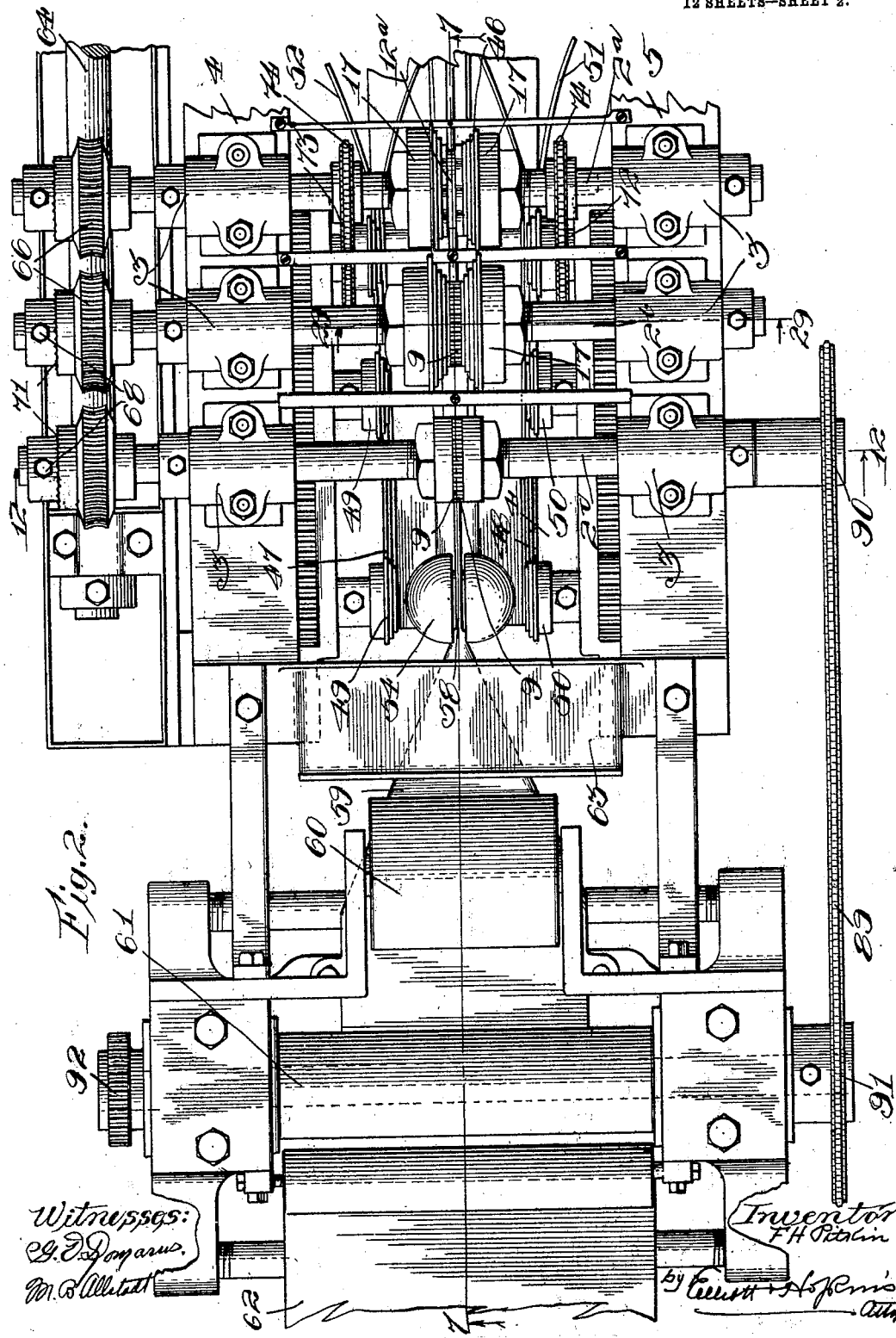

In the said drawings, Figure 1 is a side elevation of the final end of an expanded-metal machine embodying this invention. Fig. 2 is a plan view thereof. Fig. 3 is a plan view of the machine, taken at a point farther along toward the front end thereof. Fig. 4 is a plan view of the front end of the machine. Fig. 5 is a plan view of the front end with the cutters and their shafts and connected parts removed. Fig. 6 is a side elevation thereof. Fig. 7 is a vertical longitudinal section taken on the line 7 7, Fig. 12. Fig. 8 is a cross-section on the line 8 8, Fig. 7. Fig. 9 is a diagrammatic view of the slitted and expanded strip before the straightening operation is commenced. Fig. 10 is a similar view showing the first step or stage of the straightening operation. Fig. 11 is a similar view showing the second step or stage of the straightening operation. Fig. 11$^a$ is a similar view showing the final step or stage of the straightening operation. Fig. 12 is a vertical cross-section of the machine on the line 12 12, Figs. 2 and 7. Fig. 13 is a detail vertical cross-section on the line 13 13, Figs. 4 and 5. Fig. 14 is an enlarged vertical sectional view of one of the lower shears on the line 14 14, Fig. 15. Fig. 15 is a perspective view thereof. Fig. 16 is a perspective view of one of the step-blocks. Fig. 17 is a face view of one of the cutters. Fig. 18 is an enlarged vertical longitudinal section of the spreading-wedge and associated parts on the line 18 18, Fig. 19. Fig. 19 is a vertical cross-section thereof on the line 19 19, Fig. 18. Fig. 20 is a plan view thereof. Fig. 21 is a detail plan view of a guide hereinafter described. Fig. 22 is a face view of one of the worm gears or wheels. Fig. 23 is a plan view of a part of the table and the lower shears, with connected parts. Fig. 24 is a side elevation of a portion thereof. Fig. 25 is a diagram showing the manner in which the metal is cut and expanded. Fig. 26 is a vertical cross-section thereof on the line 26 26, Fig. 3, also showing the relation of the expanded metal to the cutters, the table, and the stretching or expanding means. Fig. 27 is a perspective view of one of the feed-rolls. Fig. 28 is an edge view of a part thereof, showing its relation to the lower shear. Fig. 29 is a detail longitudinal section of the last pair of expanding-rolls, taken on the line 29 29, Fig. 2. Fig. 30 is a perspective view of a stripper-bar. Fig. 31 is a perspective view of one of the adjustable slides for the lower shear. Fig. 32 is a vertical longitudinal section of the straightening-roll. Fig. 33 is a vertical longitudinal section of the oiling-rolls. Fig. 34 is a detail perspective view of the straightening and flattening wedge hereinafter described. Fig. 35 is a detail perspective view of a portion of a frame hereinafter described, and Fig. 36 is a similar view of another part thereof.

1 is a table upon which the strip of metal 1$^a$ to be expanded rests and slides while it is being cut and expanded, and extending across this table at suitable intervals are a number of parallel shafts 2, mounted in suitable journal-boxes 3 on main-frame members 4 5 and each carrying two rotary cutters 6, a detail of one of which is shown in Fig. 17, and which cutters have a plurality of knives or protruding cutting edges 7 of a special and peculiar formation, which will be presently described.

The general plan of the table 1 is of tapering formation from end to end, and the cutters 6 7 are arranged in two converging series at the edges of the table, respectively, but in parallel planes, so that the line of cut of each of the cutters will be parallel with the longitudinal axis of the table or with the line of movement of the sheet or strip of material as it passes along the table, and therefore each pair of the fluted cutters 6 7 produces two lines of slits in the metal as the latter is fed under them, each succeeding pair of cutters cutting along lines which are nearer to the center of the sheet and the table than the lines cut by the pair immediately preceding. The metal is slitted or cut by the cutters very much in the same manner as shown and explained in my aforesaid patent, the strands being pressed downwardly at the edges of the table simultaneously on both sides of the metal by the protruding knives or flutes 7 on the cutters; but in order that the cutters may have a companion shear to work against without relying upon the edge of the table for that purpose and without offering too great resistance to the movement of the sheet or strip of metal a lower or bottom shear is arranged under each of the cutters 6 7, and this is in the form of a vertical disk or roller 8, details of which are shown in Figs. 14 and 15, and which rollers or disks are supported at the sides of the table with their peripheries slightly above or flush with the surface of the table, as shown in Fig. 13, and their outer edges slightly above the lower edges of the knives or cutters 7 and set inwardly therefrom, so as to produce a shearing cut therewith and at the same time to roll in the direction of movement of the sheet as it slides along the table 1. This feeding movement of the sheet, although produced in a measure by the fluted form of the cutters 6 7, should preferably be effected by positive means that will absolutely avoid the possibility of any variation in the movement or the slipping of the sheet, and consequently directly over each of the lower shears 8 is mounted a thin disk or feed-roll 9, (shown in detail in Fig. 7,) and arranged to bear directly against the sheet and press the same into contact with the hardened periphery of the shears 8 and roll together with said shears, the periphery of the feed-roll 9 being serrated, as shown at 10, so as to have a firm grip on the sheet, and in order that the pressure of the feed-roll against the periphery of the shears 8 may not by any possibility chip the edges of the shears the edges of the feed-roll are beveled, as shown at 11, so that the latter edges do not contact with or produce pressure directly against the edges of the shears 8.

The cutters 6 7 and the feed-roll 9 are mounted or strung on shafts 2 $2^a$ in any suitable way and properly held and spaced on the shafts, so as to rotate in unison therewith, and as the construction and arrangement are the same for all of the shafts 2 a description of one of them, with reference to Fig. 13, will suffice for all. The intermediate part of the shaft, it will be seen, is suitably threaded, as shown at $2^x$, and the cutters 6 7 and feed-rolls 9 are slipped over this threaded portion and held against inward movement by a spacing-roll 12 or $12^a$, which is situated a slight distance above the surface of the table, so as to allow for the thickness of the metal passing thereunder, but which spacing-roll serves the twofold purpose of spacing the rolls 9 and cutters 6 7 and of holding the metal down flat against the table. The ends of the spacing-roll are provided with pins or dowels 13 14, which pass through perforations $13^a$ $14^a$ in the cutters and feed-rolls, respectively, and also into collars 16 on some of the shafts and stretching-rolls 17 on others, but all of which collars 16 and rolls 17 serve to back up and strengthen the cutters 6 7 on the outer sides. These collars 16 and rolls 17 are themselves backed up and firmly clamped against the cutters by nuts 18. On the particular shaft shown in Fig. 13, which is the first one of the series, (see Fig. 4,) the nut on one side is substituted by a collar 19 and set-screw 20, which collar carries a sprocket-wheel 21 for transmitting motion by a chain 22 to a pair of oiling-rollers 23, which oil the sheet of metal as it passes onto the table 1 from a feed-chute 24.

The spacing-rolls 12 $12^a$, it will be seen, are all the same in form and construction throughout the entire series, excepting that they grow shorter as the tapering end of the table is approached, and all of them, excepting the very narrow one, $12^a$, are provided with peripheral grooves 25, which also grow narrower gradually toward the tapering end of the table, and in these grooves, immediately above the table, is arranged a longitudinal stripping-bar 26, which is supported from the main frame members 4 5 by any suitable cross-rods 27, and under which stripping-bar the sheet or strip of metal passes, the bar serving to hold the metal down against the table and stripping it from the protruding knives 7 of the cutters should it by any possibility cling to said knives as the cutters revolve. It also holds the sheet flat and prevents it from buckling or wrinkling.

The construction of all of the lower shears 8 is the same for all of the cutters, and hence a description of one, with reference to Figs. 14, 15, and 23, will suffice for all. As shown in Fig. 14, the shear 8 is journaled upon a pintle 28, which projects from the side of a plate 29, and this plate is set into a recess 30 in the side of the table, one of these recesses being formed directly under each of the shafts 2 in each side of the table and the two recesses on opposite sides being directly opposite one another, as shown in Fig. 23. The plate 29 is turned with its journal or pintle 28 inwardly against the back of the recess, so as to prevent the shear 8 from slipping off its journal, and the plates 29 are themselves held in place by outside plates 31 32, secured to the sides of the table by screws 33 or other suitable means. The lower edge of each of the plates 29 rests directly upon a vertically-movable slide 34, guided by suitable ways 35 in the sides of the table and capable of adjustment by means of screws 36, having turning heads 37, which are supported upon flanges 38 on the table, and lock-nuts 39, whereby they may be held to their adjustment, the purpose of such adjustment being to adjust the lower shears 8 with great nicety relatively to cutters 6 7 and the feed-rolls 9.

When the flute or knife 7 of the cutter slits the metal, it presses the same downwardly over the face or side of the lower shear 8, and consequently makes the uncut strip narrower at that point an amount equal the combined width of the two strands simultaneously cut and pressed downwardly on opposite sides of the table, and therefore, as clearly shown in Fig. 23, the plate 29 is wider at one edge than it is at the other, so as to allow the depressed strand to move forward with the sheet along the edge of the table, which also is contracted to a width not greater than the distance between the outer faces of the two plates 29 at that point, and so on with each succeeding pair of cutters and lower shears. It will also be seen that this depression of the strand at each of the shears 8 necessitates the exposure of the outer face of each of the shears 8 at the upper edge a depth equal to the extent to which the strand is depressed, thereby forming a shoulder or rabbet 40 along the upper edge of the plate 29 on the outer side, and along which rabbet the strand slides after it is depressed by the cutter immediately above it.

When a strand which has been cut by one cutter arrives at a point directly opposite the next succeeding cutter, it is pressed downwardly by the act of the latter cutter slitting and depressing another strand diametrically opposite the first said strand, and consequently after a strand is cut its tendency is in a downwardly-inclining direction throughout the length of its travel to the end of the machine. This may be best understood from the diagram shown in Fig. 25, in which a series of five cutters are diagrammatically illustrated as having produced five cuts or slits in a sheet, counting the slits transversely of the sheet from its center outward. The first cutter on the right, it will be seen, slits the sheet at the outer edge and may produce a series or plurality of slits in the sheet before the sheet arrives at the second cutter, the number of such slits produced by the first cutter before the sheet arrives at the second cutter being dependent upon the distance between the cutters. When the sheet arrives at the second cutter, the latter engages it along a line situated inwardly from the first strand a distance equal to the width of one strand, and consequently in slitting and depressing the second row of strands it also presses downwardly the outer row produced by the first cutter, and when the sheet arrives at and is engaged by the third cutter the latter slits it along a line still farther inwardly beyond the second line or strand and, like the second cutter, depresses all of the strands outside of its plane of rotation, and so on with the fourth, fifth, and succeeding cutters throughout the series until the last pair of cutters (shown on the right in Fig. 2) is passed by the sheet, these, as explained in my aforesaid patent, being arranged a distance apart equal to the width of the center longitudinal strand or as close together as feasible. In the diagram in Fig. 25 the different strands of the expanded metal are marked "1st," "2nd," "3rd," and so on correspondingly with the marking of the cutters to indicate the respective cutters whereby they were produced. It being evident, therefore, that the strands all take a downward-inclined direction, it is important that the rabbet or shoulder 40 be similarly inclined as illustrated in Fig. 24; but in order that the strand which has already been cut and is approaching the rabbet 40 may not engage against the end thereof the latter is beveled, as shown at 40$^a$. The primary purpose of the rabbet or shoulder 40, however, is to support the strand, while still opposite the shoulder 40, belonging to the shear which cut it and while the sheet is being expanded and depressed downwardly by means other than the cutters themselves, as hereinbefore referred to. It is found that although the protruding knives 7 serve to not only cut the strand, but stretch and expand it a material degree, the strands near the lower edge of the sheet materially close together again. Therefore at the side of each of the shears 8 is arranged a series of steps or ledges 41 42 43 44, the number of these in each series being dependent upon the number of cutters used throughout the length of the machine, and these steps are so proportioned and arranged that the strands will rest and slide thereon, respectively, and above each of these series of steps is arranged one of the rolls 17, having a series of flanges or steps 46 which correspond with the flanges or steps 41 to 44, the step or flange 46 of the largest diameter on the roll being directly over the step 44, which is the lowest one of the steps below, and the flange of the smallest diameter on the roll being directly above the highest step 41, the flanges on the rolls bearing the relation to the steps shown in Fig. 26. The flanges on the rolls 17 serve to engage the strands, respectively, and to depress the mat the tie-points directly against the steps 41 to 44, over which the flanges are respectively situated, and the steps 41 to 44, it will be seen, are so inclined in the direction of the movement of the sheet that the action of the flanged rolls 17 and these steps will be to depress and expand the sheet in a downward direction and gradually as the strands are formed by the cutters 7, the strands being first depressed against the shoulder or rabbet 40 by the knives 7, next against the step 41, and then against the step 42, and so on by the flanges 46. The strands being thus individually held by their respective steps 41 44 and the flanges 46, each flange can produce only a limited amount of expansion and the expanding effect of one flange against one strand cannot be imparted to the next strand above, and as a consequence the strands are uniformly expanded. These steps 41 to 44 may be formed on any suitable member secured to the sides of the table. They are shown as being formed on the blocks $66^\times$, which hold the shear blocks or plates 29 in place. The flanges 46 which occur on the rolls 17 are not employed on the collars 16, because at these points the metal strip has not been sufficiently slitted to require any auxiliary means for producing this expansion, and for the same reason the number of the flanges 46 on the rolls 17 may be gradually decreased toward the front or feeding end of the machine—that is, the right-hand end presented in Fig. 4. Thus in this figure it will be seen that the two left-hand rolls 17 have but one of the expanding-flanges 46. This same reduction may be followed with respect to the steps 41 to 44, if desired; but in practice the plates 32 may be produced from a single die or other tool, and consequently would be facsimiles for all of the rolls.

The described operation results in a strip of expanded metal which is approximately inverted-V shape in cross section, as better shown in Fig. 26, saddled upon the table 1, with its center strand resting upon the narrow part of the table and the cut strand at each side of the center pressed downwardly immediately contiguous to the edges of the table, and in order that the sheet or strip after the entire slitting operation has been completed—that is, all the strands have been formed—may be given a final stretching as a whole preparatory to being flattened out additional stretching devices are employed at the end of the series of cutters and so arranged as to engage the lower edges of the two sides of the V-shape strip as the same hang down from the table. These additional stretching devices are in the form of longitudinally-arranged steps 47 48, located on both sides of the table 1, considerably below the level thereof, and a plurality of flanged rolls 49 50, which bear the same relation to the steps 47 48, respectively, as the flanges 46 bear to the steps 41 44, and these steps 47 48 and flanged rolls 49 50 take possession of the edges of the strip and expand it in the same manner as described with reference to the flanges 46 and steps 41, &c., the steps 47 48 being inclined, so that as the sheet passes from the forward pair of the rollers 49 50 to the next succeeding pair of said rollers it will be pulled downwardly. The downwardly-extending edges of the sheet are caught and guided into the possession of these lower expanding-rolls 49 50 by suitable guides 51 52, flared outwardly at their forward ends to receive the edges of the sheet and contracted or converged toward the steps 49 50. The final slitting is produced by the pair of cutters 7, (shown on the right in Fig. 3,) which are arranged a distance apart equal to the width of the center strand, and where the distance between the cutters is so very slight as this the feed roll or disk 9 may be omitted. On the next shaft or shaft $2^b$ one of the feed-rolls 9 is employed between the flanged rolls 17 for the purpose of advancing the sheet, but the cutters are omitted, and one of these feed-rolls 9 is also employed on the next shaft $2^c$ for the same purpose, and on this shaft the flanged rolls 17 are omitted, as the sheet will be sufficiently expanded at this point by the lower rolls 49 50, which stretch the sheet as a whole. When the sheet arrives at the last pair of cutters, (shown on the right in Fig. 2,) it is in the form shown in Fig. 26, with the strands produced by this pair of cutters pressed downwardly on both sides of the table, and from this point on the straightening operation begins, and the first step thereof consists in wedging apart these two strands, which hug the sides of the table after the last pair of cutters is passed. This spreading is effected by a wedge 53, formed on the last one of the plates 29, which is beveled in vertical section also (see Fig. 19) and which bends the sheet into the form shown in Fig. 10, it being previously in the form as shown in Fig. 9. This destroys the very sharp angle on each side immediately contiguous to the center strand and prepares the sheet for a further bending or straightening, which takes place when it passes over a ball-shaped or convexed roller 54, which will be presently described. Arranged partially over the wedge 53 and in advance thereof is a shoe 55, which is supported by a cross-bar 56 and which has an upturned end 57 to permit the sheet to pass under the shoe without danger of striking the end thereof, and the under side of the shoe directly over the table 1 is formed with a longitudinal groove 58, which receives the center strand of the sheet and prevents this from buckling or wrinkling, while also holding it centrally on the table, it being found in practice that the action of the rollers and cutters upon the sheet sometimes cause the center strand to kink or buckle, and should that occur at the time the sheet is passing the wedge 53 it would ride upwardly over the wedge a sufficient distance to defeat the purpose of the wedge. The shoe 55 being mounted at its mid-length upon the bar 56 and the bar being comparatively narrow, the shoe is afforded more or less rocking movement in a vertical plane to allow for slight irregularities in the center strand passing under it.

The ball-shaped roller 54, upon either side of which is located one of the stretching flanged rolls 49 50, bends the sheet into the form shown in Fig. 11, the said flanged rolls 49 50 serving to pull the ends downwardly while it passes over this roller. The roller is in the form of two hemispheres arranged axially, with their flat sides a slight distance apart to accommodate a projection 58 on the end of the final flattening-wedge 59, which latter serves to convey the sheet after it passes over roller 54 to a flattening-roll 60, arranged over and bearing upon the wedge 59, whose upper surface is flat and serves to bend the sheet into an approximately flat form, and after passing under roller 60 it is fed between two squeeze-rolls 61, which produce the final flattening operation and project the sheet upon a table 62, whence it may be removed. The roller 54 is shown in detail in Fig. 32 and has a journal 63 connecting its members together and rotatably supporting it upon a bracket 64, which is adjustably secured by bolt 65 to a portion $66^\times$ of the table-casting 1.

Arranged over the flattening-wedge 59 is a guide 63, the same being situated in advance of the roller 60 and with that edge which is turned toward the roller projected downwardly toward the face of the wedge 59 and its opposite edge projected away therefrom, so as to catch the advance end of the sheet of metal and hold the same closely to the surface of the wedge 59 while it is being straightened out and flattened or converted from the curved form shown in Fig. 11 to the flat form shown in Fig. $11^a$ by the combined action of the wedge 59 and roller 60.

The shafts 2, $2^a$, $2^b$, and $2^c$ derive motion from a line-shaft 64, extending transversely of the ends thereof and having as many worms 65 as there are shafts 2 $2^a$ $2^b$ $2^c$, which engage, respectively, with worm-wheels 66, secured on the latter said shafts. In order that the cutters 6 7 may be adjusted, however, relatively to the worm-wheel 66, so as to bring the knives 7 of the individual cutters in the proper position with relation to the lower shears, the connection between the wheels 66 and their respective shafts is made adjustable in some suitable way—such, for example, as providing the shaft with a rigid collar 67, held thereon by set-screws 68 or other suitable means and having curved slot 69, through which passes a set-screw 70, having its inner end screw-threaded in the wheel 66—so that by loosening the set-screw 70 the shaft may be turned independently of the worm-wheel and the cutters 6 7 thereby adjusted throughout the range of the slot 69. In order to afford the contacting faces of the collar 67 and wheel 66 better holding efficiency, the same may be serrated, as shown at 71.

Motion is imparted to the lower stretching-rolls 49 50 from the shaft $2^a$ by means of two sprocket-chains 72 73 and sprocket-wheels 74 75 on the shaft $2^a$ and two stud-shafts 76, respectively. The stud-shafts 76, respectively, drive two independent trains of gears 77, 78, 79, 80, and 81, the gears 77, 79, and 81 being mounted upon the shaft 76 and shafts 82 83, which constitute the shafts of the flanged rolls 49 50. The two middle shafts 82 of each of the series of gears are shown in Fig. 12, and the construction and arrangement of the shafts 76 83 is the same. The gears 78 and 80 are idlers interposed in the train for driving the rolls 49 50 in the proper direction. The gears 78 and 80 are mounted on stud-shafts 84, and all of these stud-shafts 76 82 83 84 are mounted in frames or brackets 85, one on each side of the table, as better shown in Fig. 12. The ends of these brackets 85 are turned outwardly, as shown at 86, Fig. 36, and secured to the frame members 4 5, respectively, at each end by means of set-screw 87, passing through slot 88 in the outturned end 86 and secured in the frame members 4 5, so that the brackets 85, together with the series of steps 47 48, which are also carried by the brackets, may be adjusted in unison with the flanged rollers 49 50 and their respective train of gears, the outturned ends 86 of the brackets providing room between the frame members 4 5 and the brackets for the train of gears, which are arranged on one side of each bracket, while the flanged rolls 49 50 are arranged on the other side.

Motion is imparted to the squeeze-rolls 61 by a chain or belt 89, driven by a sprocket 90 on the shaft $2^c$ and driving a sprocket 91 on the upper one of the rolls 61, and motion is imparted to the lower one of the rolls 61 by two gears 92 93 on said rolls, respectively, the roll 60 being an idler.

Referring now to the form of the cutters, one of which is shown in Fig. 17, it will be seen that while in the aforesaid patent the protruding knives were angular or V shape in the present invention the greater part of the cutting edge of each of the knives 7 is in an arc concentric with the center of rotation, while the ends of each knife 7 round inwardly toward such center. The purpose of having the knives 7 protrude from the body of the cutter is of course to produce disconnected slits whereby the strands are formed and more or less depressed or expanded; but to be efficient with all grades of sheet metal the protruding knives should be so formed as to produce a shear cut. With a V-shape cutter, however, it will be seen that as the cutter rotates one edge of each knife at one time during the cutting operation is almost parallel with the surface which it is cutting, and consequently with some grades of metal it tears or breaks the strands. With the knife 7 constructed or formed as shown and described with reference to Fig. 17 it will be seen that the edge is at no time squarely against the surface which it is cutting and it is at all times producing a shear cut, and after the strand is fully cut it is depressed or expanded an extent equal to the extent to which the knife projects from the body of the cutter without danger of breaking the strand or fracturing the tie.

With a machine thus constructed a sheet of metal of the proper width and length is fed into the right-hand end thereof as viewed in Fig. 4, through the guide 24, and under the oiling-roller 23, which lubricates it and reduces the wear on the cutters and shears. As soon as the end of the sheet is caught by the first pair of feed rolls or disks 9 it is fed automatically along the surface of the table 1 under the succeeding pairs of feed-disks, and as it thus passes it is slitted in parallel lines by the cutters 6, and the protruding knives 7 thereof press the strand downwardly simultaneously on the outer sides of the lower shears 8. As soon as the strands reach the steps 41 to 44 the tie of each—that is, the point where one strand adjoins the adjacent strand—rests and slides upon one of these steps, and one of the flanges 46 of the rolls 17 engages a tie of each strand on the upper side directly over one of the steps and presses the same downwardly against the step, as shown in Fig. 26, thereby preventing the subsequent slitting of the metal from distorting or reducing the expansion produced by the protruding knives 7. This slitting of the metal continues as the sheet passes along the table until the final end of the sheet passes the last pair of cutters, (shown on the right in Fig. 2,) which are arranged so close together as to leave only a narrow strand of uncut metal down the center of the finished strip, as explained in the aforesaid patent; but at or about the time the forward end of the sheet arrives at said last pair of cutters the lower edges of the sheet come into engagement with the guides 51 52, and these direct the same upon the steps 47 48, where the strands are individually engaged at the tie-points first by the series of flanged rolls 49 50 on the right as viewed in Fig. 2 and then by the succeeding pairs of said rolls, which draw the edges of the sheet downwardly in an inclined direction as it moves along the steps 47 48, and thereby imparts a uniform expansion simultaneously to both halves of the strip and at the same time holds the strip firmly down in place while it is being acted upon by the double wedge 53 and the convexed roller 54 for converting it into a flat form.

Having thus described my invention, what I claim as new therein, and desire to secure by Letters Patent, is—

1. In an expanded-metal machine the combination of means for slitting the metal, and means other than said slitting means for engaging the individual strands of the metal and holding the same against contraction.

2. In an expanded-metal machine the combination of means for slitting the metal, and means other than said slitting means for simultaneously engaging a plurality of the strands in a crosswise series and holding the same against contraction.

3. In an expanded-metal machine the combination of means for slitting the metal, and means other than said slitting means for simultaneously engaging a plurality of the strands of the metal in a crosswise series and holding the same against contraction, operatively connected with said slitting means and acting in unison with and during the slitting action thereof.

4. In an expanded-metal machine the combination of means holding and advancing the strip of metal, means for slitting the strip, a step upon which to support the strand, and means for pressing the strand against said step.

5. In an expanded-metal machine the combination of means for holding and advancing the strip of metal, means for slitting the strip, a plurality of steps upon which to support the strands respectively, and means matching with said steps respectively for pressing the strands against the steps.

6. In an expanded-metal machine the combination of means for holding and advancing the strip of metal, means for slitting the strip, a step upon which to support the strand after it is formed and during the slitting of another strand, and means for pressing the former said strand against said step.

7. In an expanded-metal machine the combination of a table, a plurality of steps arranged in an inclined series at the side thereof, means at the edge of the table above said steps for slitting the metal, and a roll arranged over said steps and having flanges matching with said steps for holding the strands against said steps respectively.

8. In an expanded-metal machine the combination with means for slitting the metal, and means for imparting the initial expansion thereto, of final expanding means comprising steps over which the strands engage and a roll having flanges matching said steps for engaging and pressing the strands thereon.

9. In an expanded-metal machine the combination with means for slitting the metal, and means for imparting the initial expansion thereto, of a plurality of flanged rolls arranged in the line of movement of the strip of metal and adapted to engage with the strands thereof, and inclined steps continuing from one of said rolls to the other in the line of movement of the strands and adapted to support the same, the flanges of said rolls matching the said steps and being adapted to press the strands against the steps respectively so as to pull the sheet downwardly as a whole and impart further expansion thereto as the movement of the sheet progresses.

10. In an expanded-metal machine the combination of a table, means at both edges thereof for slitting the metal and depressing the strands thereof, a series of steps arranged at each side of the table for engaging the individual strands of the metal and means for pressing the strands individually against said steps at both sides of the table simultaneously.

11. In an expanded-metal machine the combination of a table, means at both sides thereof for slitting and depressing strands of the metal while resting upon said table, and a stripper extending longitudinally of the table for engaging the upper side of the metal and preventing the latter from lifting from the table.

12. In an expanded-metal machine the combination of a table, cutters arranged at the sides thereof for slitting the metal resting upon the table, a grooved spacing-roll arranged between said cutters and having its periphery arranged contiguous to the surface of the table and provided with a circumferential groove, and a stripper-bar arranged longitudinally of the table in said groove and at a distance above the level thereof, for engaging the upper side of the metal and preventing it from lifting from the table.

13. In an expanded-metal machine the combination of a disk or narrow roll, for supporting the sheet of metal, a feed-roll engaging the periphery of said disk, for pinching and feeding the metal, and a cutter having protruding knives arranged in shearing relation contiguous to and overlapping the face of said disk for engaging and slitting the metal.

14. In an expanded-metal machine the combination of a table, a disk or narrow roll having a central aperture, fitted at the side of the table, a plate fitted over the outer side of said disk and having a journal projecting into said aperture for supporting and journaling said disk, means for holding said plate against outward movement, means below said plate for vertically adjusting the same and means coöperating with said disk for slitting a sheet of metal.

15. In an expanded-metal machine the combination of a disk, a plate in which said disk is journaled and from the upper edge of which the edge of the disk protrudes, said plate having a horizontal shoulder or rabbet along the outer face thereof and which shoulder or rabbet is wider at one end than at the other, means co-acting with said disk for slitting and depressing a strand of the metal at the edge thereof over said rabbet, and means for slitting and depressing a strand of the metal at another point in a plane inwardly from the outer face of said disk.

16. In an expanded-metal machine the combination of a disk, a plate in which said disk is journaled and above the edge of which the disk projects, one edge of said plate at the top thereof being projected outwardly from the plane of the outer side of the disk and the other edge at the top thereof being substantially flush with the said plane, means coacting with said disk for depressing a strand of metal downwardly against the outer face of the disk, and means removed from said disk for depressing a strand of the metal downwardly in line with the plane of the outer face of the wider edge of said plate.

17. In an expanded-metal machine the combination of a table tapering from end to end and having a succession of recesses diametrically opposite each other in the sides thereof, a plate set in each of said recesses and having its outer face parallel with the longitudinal axis of the table and its edge at one side of the recess projected from said longitudinal axis a farther distance than at the other side of the recess and both sides of the plate being substantially flush with the side of the table at its upper edge, rotary disks journaled in said plates respectively, and means coöperating with each of said disks for slitting the metal and depressing a strand thereof over the outer face of the disk.

18. In an expanded-metal machine the combination of a rotary disk, a feed-roll engaging the periphery of the disk and having beveled edges, and a cutter arranged contiguous to and overlapping one face of the disk.

19. In an expanded-metal machine the combination of means for producing a strip of expanded metal approximately inverted-V shape in cross-section, and means for engaging between the sides of said strip and bending it into a flat form.

20. In an expanded-metal machine the combination of a tapering table or support for the sheet to be slitted and expanded, means for slitting and depressing strands from the sheet on both sides of the table and producing a strip of expanded metal approximately inverted-V shape in cross-section, and means arranged at the smaller end of the table in the line of movement of the strip, for engaging between the sides thereof as the strip advances and bending or spreading same into a flat form.

21. In an expanded-metal machine the combination of means for producing a strip of expanded metal substantially V shape in cross-section, a wedge arranged in the line of movement of the strip and adapted to engage between the sides thereof for imparting an initial spreading thereto, and means of a wider angle than said wedge located farther along in the line of movement of the strip and adapted to engage between the sides of the strip for spreading the same farther apart.

22. In an expanded-metal machine the combination of means for producing a strip of expanded metal approximately V shape in cross-section, means for holding the strip along the center thereof at the apex of such V and means for engaging between the sides of the strip while thus held and spreading the sides apart.

23. In an expanded-metal machine the combination of means for producing a strip of expanded metal approximately V shape in cross-section, a roller arranged in the line of movement of the strip and having convex ends adapted to engage between the sides of the strip for spreading the same apart, and means for forcing the strip over said roller.

24. In an expanded-metal machine the combination of means for producing a strip of expanded metal approximately V shape in cross-section, a wedge having a flat surface presented toward the crotch of said V for engaging between the sides of said strip and spreading the same apart, and a flattening-roller arranged over the flat surface of said V for flattening the strip thereagainst.

25. In an expanded-metal machine the combination of means for producing a strip of expanded metal approximately V shape in cross-section, a wedge arranged to engage between the sides of said strip for imparting the initial spreading thereto, and means arranged over said wedge for holding the apex of the strip against the wedge.

26. In an expanded-metal machine the combination of means for producing a strip of expanded metal approximately V shape in cross-section, a wedge arranged to engage between the sides of the strip for imparting the initial spreading thereto, and a shoe having a groove opposed to the face of said wedge and arranged longitudinally along the line of movement of the strip for receiving the apex of the strip and holding the same against the wedge.

27. In an expanded-metal machine the combination of means for producing a strip of expanded metal approximately V shape in cross-section, a spreading member arranged in the line of movement of the strip for engaging between the sides thereof and being beveled from its top downwardly on both sides and at its forward end, and means for holding the strip against said spreading member and drawing it thereover.

28. In an expanded-metal machine the combination of means for producing a strip of expanded metal approximately V shape in cross-section, a roller having convexed ends arranged in the line of movement of the strip for engaging between the sides thereof, steps arranged at both ends of said roller and adapted to support the individual strands of the strip, and flanged rolls arranged one at each end of said roller for engaging the individual strands of the strip and holding the same against said steps as the strip passes over said convexed roller.

29. In an expanded-metal machine the combination of means for producing a strip of expanded metal approximately V shape in cross-section, a roller having convexed ends arranged in the line of movement of the strip for engaging between the sides thereof, a wedge having a projection let into said roller, a flattening-roller arranged over said wedge, and means for forcing the sheet over said convexed roller and wedge and under said flattening-roller.

30. In an expanded-metal machine the combination of means for producing a strip of expanded metal approximately V shape in cross-section, means for engaging both sides of said strip and pulling the same in a direction away from the apex thereof, and converging guides arranged in the line of movement of both sides of the strip for catching the same and directing said sides to their said respective stretching means.

31. In an expanded-metal machine the combination of a cutter-shaft, two rotary cutters mounted thereon for slitting the sheet, means for supporting the sheet while being thus acted upon by the cutters, a drive-shaft, a gear connecting said drive-shaft with said cutter-shaft, and means whereby the cutter-shaft may be adjusted rotatably independently of said gear.

32. In an expanded-metal machine the combination of means for slitting the metal at intervals in rows transverse to the direction of the slit, and thereby producing strands, and means for engaging and holding one of said strands while another strand in the same transverse row is being cut or formed.

33. In an expanded-metal machine the combination of means for slitting the metal at intervals in rows transverse to the direction of the slit, and thereby producing strands, and means for engaging and holding the strands immediately contiguous to a strand which is being cut or formed in the same transverse row.

34. In an expanded-metal machine the combination of means for slitting the metal at intervals in rows transverse to the direction of the slit, and thereby producing strands, and means for engaging and holding a plurality of strands in one of said transverse rows while another strand in the same transverse row is being cut or formed.

35. In an expanded-metal machine the combination of means for slitting the sheet to produce strands, and means for engaging and holding a multiplicity of said strands simultaneously in a series extending transversely of the sheet.

36. In an expanded-metal machine, a rotary cutter comprising a plurality of flutes or protruding knives, each having the greater part of its cutting edge constituting a portion of an arc concentric with the center of rotation of the cutter and the ends of said knives being rounded inwardly toward the center of the cutter, in combination with a companion shearing member having a reversely-curved edge arranged contiguous to the plane of rotation of said rotary cutter.

37. In an expanded-metal machine the combination of means for holding and feeding the sheet, a rotary knife for slitting the metal having peripheral flutes whereby strands of the metal will be formed and pressed away from the plane of the sheet, and means opposite said flutes for engaging and holding the strands individually.

F. H. PITKIN.

Witnesses:
F. A. HOPKINS,
M. B. ALLSTADT.